Oct. 6, 1959     J. W. HUDSON     2,907,813
ELECTRICAL FITTING
Filed Oct. 31, 1955     3 Sheets-Sheet 1
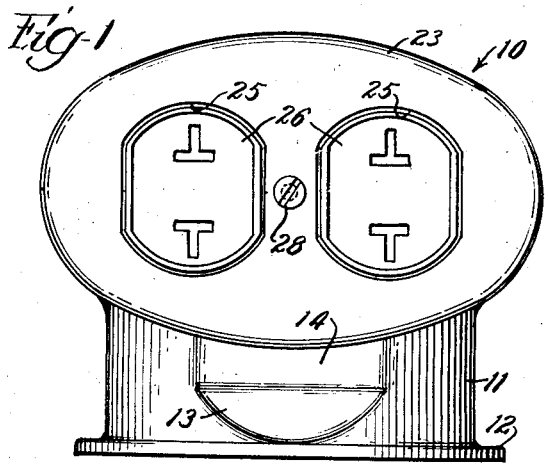
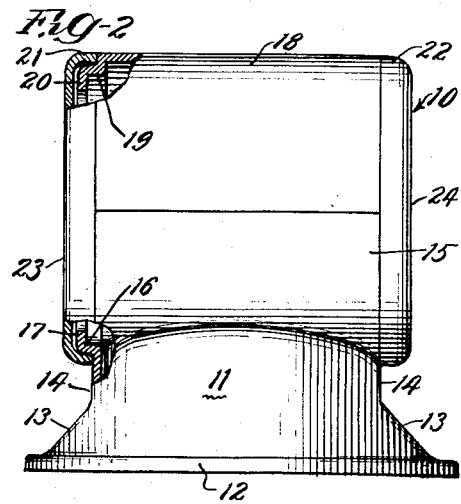
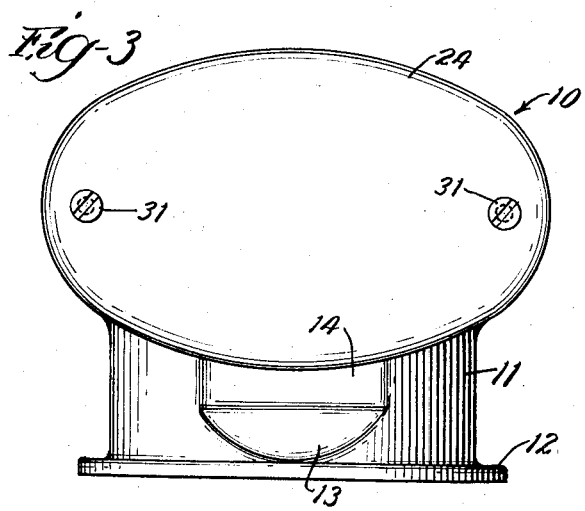
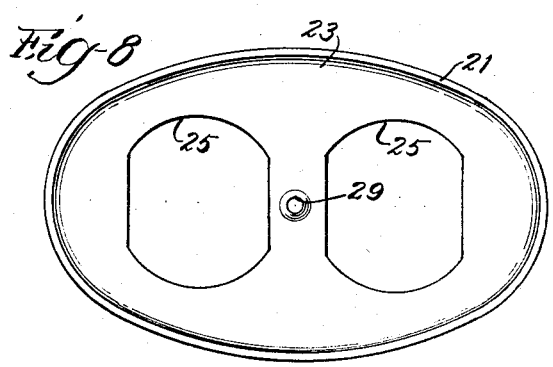
INVENTOR.
James W. Hudson
BY
Cromwell, Greist & Warden
Attys.

Oct. 6, 1959     J. W. HUDSON     2,907,813
ELECTRICAL FITTING
Filed Oct. 31, 1955     3 Sheets-Sheet 2
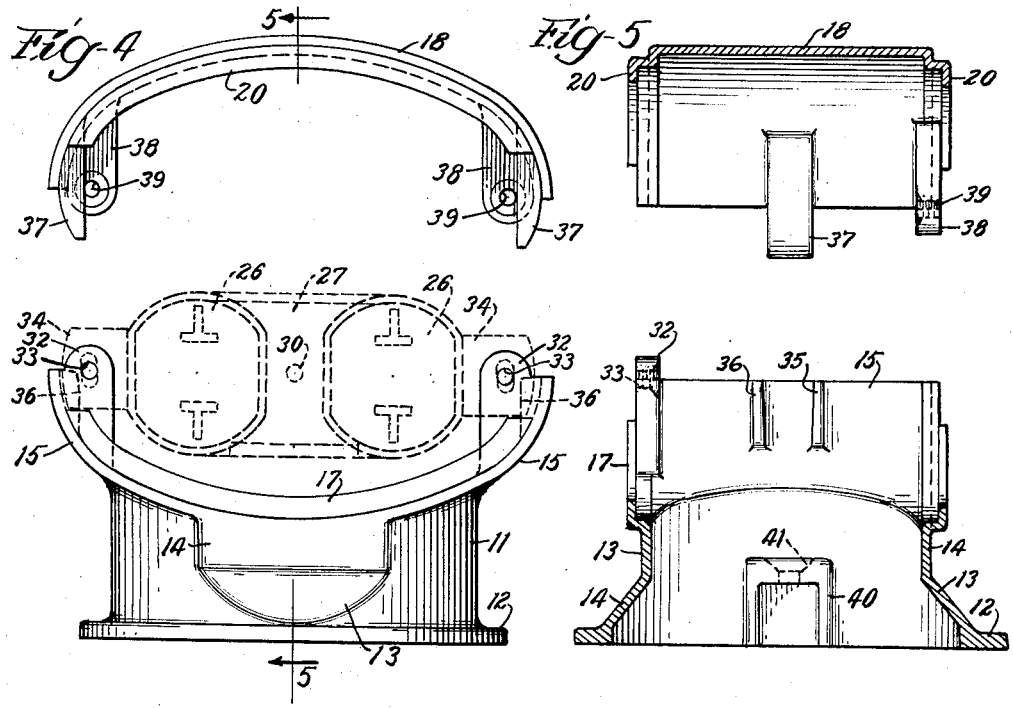
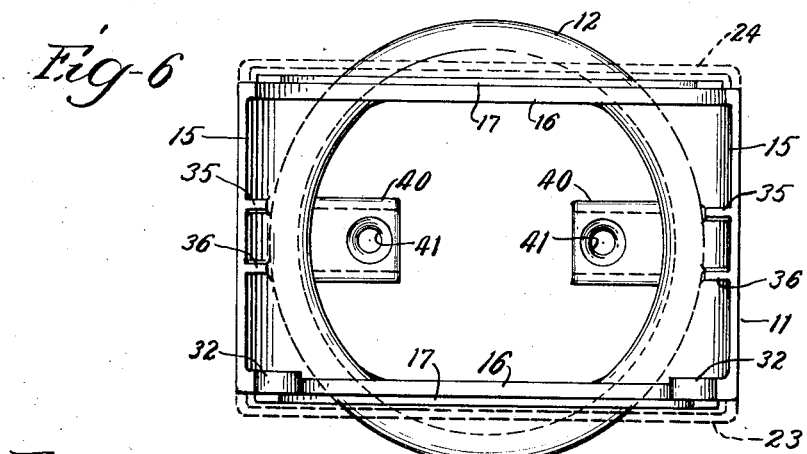
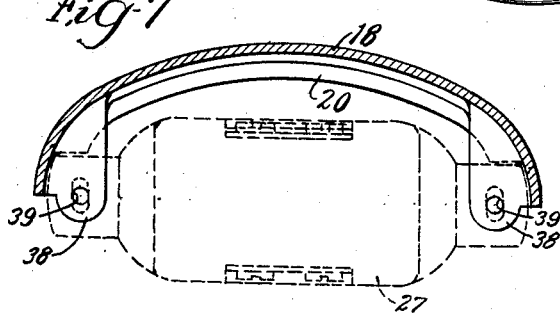
INVENTOR.
James W. Hudson
BY
Cromwell, Greist & Warden
Attys.

Oct. 6, 1959 — J. W. HUDSON — 2,907,813
ELECTRICAL FITTING
Filed Oct. 31, 1955 — 3 Sheets-Sheet 3

INVENTOR.
James W. Hudson
BY
Cromwell, Greist & Warden
Attys.

United States Patent Office 2,907,813
Patented Oct. 6, 1959

2,907,813

ELECTRICAL FITTING

James W. Hudson, Elmhurst, Ill., assignor, by mesne assignments, to The National Supply Company, a corporation of Ohio Application October 31, 1955, Serial No. 543,959

2 Claims. (Cl. 174—48)

The present invention relates generally to an electrical fitting of improved construction for use with an underfloor wire distribution system. More specifically, the invention is directed to an electrical fitting adapted for mounting above the floor covering independent of the walls of a room, which fitting is provided with wiring means such as at least one electrical service outlet or telephone cable-carrying bushing for use with an underfloor wire distribution system buried in the sub-flooring.

It is an object of the present invention to provide an improved electrical fitting adapted for use with an underfloor wire distribution system, which fitting incorporates many improved features of design to allow the fitting to be readily connected to the underfloor wire distribution system and the wiring means carried thereby placed into service.

Still another object is to provide an electrical fitting of improved structure which includes a housing in which at least one wiring device is mounted and into which housing access may be readily gained for wiring device installation purposes as well as wiring device maintenance.

Another object is to provide an electrical fitting of improved appearance and structural design which may be installed above the floor covering of an office building or the like without being initially used in connection with the wire distribution system buried under the floor covering, and which, when subsequently desired, may be readily placed into use by interchangeable standardized parts, the fitting being further adapted to receive standardized service outlets or a special form of cable bushing which may be readily installed and connected for use with the underfloor system without the necessity of removing the fitting from its association with the floor and the buried wire ducts of the system.

Still another object taken in conjunction with the foregoing is to provide an improved electrical fitting which may be readily converted from a single wiring means to a plurality of wiring means and which is of improved design to allow full accessibility to all necessary elements of the fitting to allow easy and efficient rearrangement, increase or decrease of the number of wiring means maintained thereby.

A further object is to provide a specially designed cable-carrying bushing for attachment to one of several different forms of standardized parts for efficient and easy installation to equip the fitting for telephone cable dispensing and the like.

Other objects not specifically set forth will become apparent from the following detailed description made in conjunction with the drawings wherein:

Fig. 1 is a side elevation of the fitting of the present invention;

Fig. 2 is an end elevation in partial section of the fitting;

Fig. 3 is a side elevation of the opposite side of the fitting;

Fig. 4 is an exploded view in side elevation of the base and top members with the side plates removed and illustrating the mounting of a standard service outlet shown in broken lines therein;

Fig. 5 is a vertical section of the exploded view of Fig. 4 taken along the line 5—5 of Fig. 4;

Fig. 6 is a top plan view of the base member of the fitting illustrating the side plates in broken lines in their operative positions;

Fig. 7 is a vertical section of the top member shown in Fig. 4 illustrating a modified positioning of a standard service outlet shown in broken lines therein;

Fig. 8 is a rear elevation of one form of side plate suitable for use with the fitting of the present invention;

Figure 9:
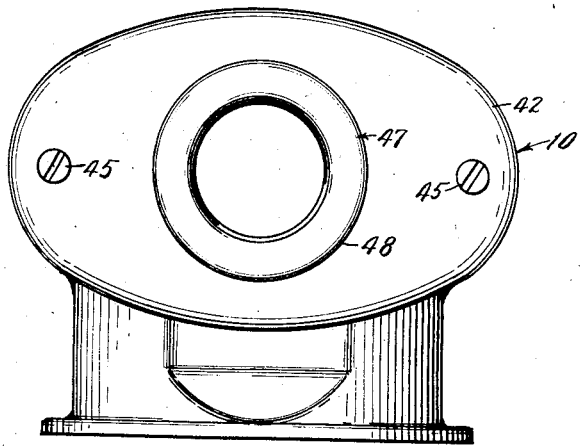
Fig. 9 is a side elevation of the fitting having a modified form of side plate carrying a special bushing attached thereto.

Referring in particular to Figs. 1–3 the electrical fitting of the present invention generally designated by the numeral 10 is formed from a base member 11 which is provided with a horizontally extending circumferentially continuous bottom flange 12 adapted to rest upon the floor covering, and indented side margins 13 and 14. The base member 11 is of generally cylindrical outline with respect to its lower vertically extending portion and is provided with an integral upper portion formed from laterally spaced outwardly and upwardly extending end flanges 15 which will subsequently be described in detail. The side walls of the base member 11 extending between the flanges 15 as shown particularly in Fig. 2 are provided with radially extending segments 16 and upwardly directed flanges 17.

The fitting 10 is further provided with a top member 18 which is of arcuate shape and which rests at its ends on the top surfaces of the end flanges 15 of the base member 11. The top member 18 is provided with a radially extending portion 19 along each of its sides which has integrally formed therewith a downwardly directed flange 20. The flanges 17 and 20 on both sides of the fitting 10 are recessed along the outer margins by reason of the radial portions 16 and 19 to receive circumferentially continuous inwardly directed flanges 21 and 22 of side plates 23 and 24 respectively.

As shown in Figs. 1 and 8 the side plate 23 is provided with apertures 25 which are aligned with plug-receiving portions 26 of a conventional service outlet 27 which is shown in its entirety by broken lines in Figs. 4 and 7. A centrally located screw 28 is received through an aperture 29 in the side plate 23 and a tapped hole 30 of the standard service outlet 27 receives the screw 28 to retain the side plate 23 in its operative position on the fitting 10. The side plate 24 is shown in Fig. 3 as being provided with screws 31 which cooperate with internally located elements of the fitting, to be subsequently described, to retain the plate 24 in its operative position. In comparing the side plates 23 and 24 it should be noted that these plates are of the same design with the exception that each is not necessarily provided with service outlet apertures 25. The interchangeability of these plates is important for reasons to be discussed.

Referring in particular to Figs. 4–7 the internal structure of the fitting 10 will now be described. The base member 11 as previously described is formed of outwardly and upwardly curved end flanges 15 which define the upper portion thereof and generally provide the base member 11 with an arcuate shape. Along each of the sides of the upper portion of the base member 11 and extending substantially to the full height of the end flanges 15 are the vertical directed side flanges 17 of arcuate outline. Extending upwardly from the inner surface of each of the end flanges 15 is a service outlet or side plate mounting flange 32 provided with a tapped hole 33. The flanges 32 receive end flanges 34 of the standard service outlet 27 and securely position the outlet 27 within the fitting 10 by use of screws which are not shown.

Also mounted on the inner surface of each of the end flanges 15 are two projecting laterally spaced flanges 35 and 36 which form therebetween a groove 37 to receive tongues 37 depending from each end of the top member 18. As will be noted the top member 18 is of arcuate shape and as previously described is provided on each of the sides thereof with a depending flange 20. The bottom edges of the ends of the top member 20 are designed to rest upon the top surfaces of the end flanges 15 of the base member 11 when the two are assembled. In this relation the tongues 37 fit between the projections 35 and 36 at each of the ends of the fitting 10 to align the top member 18 with the base member 11 for proper assembling thereof.

The top member 18 is provided with depending flanges 38 located near each of the ends thereof and slightly inwardly of one of the sides thereof. The flanges 38 are provided with tapped holes 39 which are adapted to receive screws to retain a standard service outlet 27 in position with respect to the top member 18 as shown in Fig. 7. It should be particularly noted with respect to Fig. 5 that the service outlet holding flanges 32 of the base member 11 and 38 of the top member 18 are positioned at opposite sides of the fitting 10. As a result, a service outlet 27 may be mounted by the flanges 32 on the base member 11 and its plugs-receiving portions aligned with one side of the fitting 10 while an additional service outlet 27 may be attached to the flanges 38 and aligned with the other side of the fitting 10. Under these circumstances it would then be necessary to make use of a side plate 23 having apertures 25 therein to allow access to be gained to the service fittings 27 from the outside of the fitting 10 on each side of the fitting 10. However, when it is desired merely to make use of a single service outlet 27 on one side of the fitting 10 it is then necessary to make use of a plate 24 to completely seal off the other side opening thereof.

Because of the design of the electrical fitting 10 a plate 24 may be suitably held in place by making use of either one of the pairs of flanges 32 and 38 to retain the plate 24 by screws 31 on the fitting 10. In other words, the side plates 23 and 24 are in fact standardized thereby being readily interchangeable in the event that it is desired to either add a service outlet 27 to the fitting 10 or remove a service outlet 27 from the fitting 10. Furthermore the fitting 10 may be initially installed with the prospect of subsequently placing it into use. Under these circumstances each of the side openings of the housing formed by the base member 11 and top member 18 may be completely sealed by using a side plate 24 to cover both openings and serve as side opening blanks. Under such conditions each of the pairs of flanges 32 and 38 would be used to receive screws 31 to maintain the plates 24 in their operative positions. When it is desired to place the fitting 10 into use one of the plates 24 may be replaced by the plate 23 and one of the pairs of flanges 32 and 38 may be used to mount a service outlet 27. As previously described the plate 23 is then retained by the fitting through the use of the screw 28 passing through the aperture 29 into the tapped hole 30 of the outlet 27.

Obviously any form of service outlet 27 may be used with respect to the number of plug-receiving portions carried thereby. In the event that an outlet 27 having a single plug-receiving portion 26 is made use of, a standardized side plate similar to plate 23 but having only a single aperture 25 may be then substituted to properly seal a side opening of the electrical fitting 10.

The base member 11 and top member 18 cooperate as previously described to form a housing closed at both ends and open along the sides thereof. The general shape of the housing as shown is oval but it should be understood that other shapes may be used while still incorporating the principles of the present invention. The base member 11, as particularly shown in Fig. 6, is provided with inwardly projecting inverted U-shaped flanges 40 which are provided with drilled holes 41. The flanges 40 serve the purpose of mounting the electrical fitting 10 through its base member 11 to any suitable means such as a separate element which is received by a wiring duct of the underfloor wire distribution system. The various ways of mounting the fitting 10 by use of the flanges 40 are fully described in my copending application, Serial No. 543,960, filed October 31, 1955 and do not form a part of the present invention.

Figure 10:
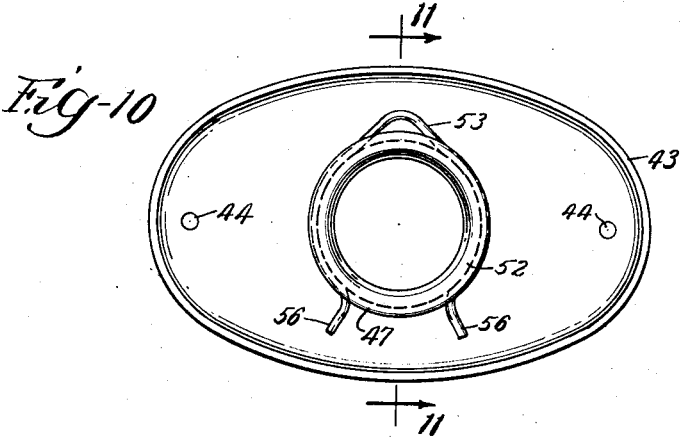
Fig. 10 is a rear elevation of the modified side plate shown in Fig. 9.
Figure 11:
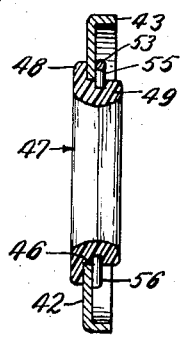
Fig. 11 is a vertical section of the side plate of Fig. 10 taken along line 11—11 in Fig. 10.
Figure 12:
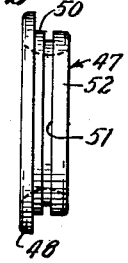
Fig. 12 is a side elevation of the special bushing with the spring clip removed.
Figure 13:
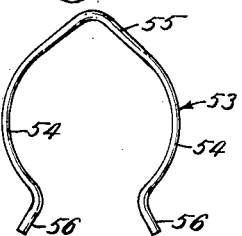
Fig. 13 is an elevation of the spring clip.

To further illustrate the advantages gained from the use of standardized side plates such as the side plates 23 and 24 previously described, reference is made to Figs. 9–11. The fitting 10 shown in Fig. 9 is provided with a side plate 42 which is similar to side plate 24 in that it is provided with an inwardly directed circumferentially continuous flange 43 and drilled holes 44 which receive therethrough screws 45 which, in turn, are threadedly received by one of the previously described pairs of flanges 32 and 38 within the housing of the fitting 10. The side plate 42 is provided centrally thereof with a circular aperture 46 which receives therethrough a specially designed bushing 47 shown in detail in Figs. 12 and 13. The bushing 47 is provided with a radially directed flange 48 extending from a cylindrical body portion 49 which is provided centrally thereof with an aperture which receives therethrough a telephone cable or the like, not shown. Rearwardly of the radial flange 48 is an axially extending shoulder 50 which is received by the aperture 46 and which has an outer diameter slightly less than the diameter of the aperture 46 to allow a substantially close fit therebetween. Rearwardly of the shoulder 50 is an inwardly directed circumferentially continuous groove 51 which is defined on one side by the rear radial wall of the shoulder 50 and a rear radial wall of a rearwardly positioned second shoulder 52. The groove 51 is adapted to receive a spring clip 53 which is defined by two semi-circular portions 54 integrally connected at one of their ends by a U-shaped outwardly directed portion 55 and provided at their other ends, which are independent of one another, with outwardly directed integrally connected arms 56.

The bushing 47 is inserted through the aperture 46 of the side plate 42 and the spring clip 53 is positioned within the groove 51 to retain the bushing 47 in its operative position with respect to the side plate 42. The U-shaped portion 55 and the arms 56 of the spring clip 53 extend outwardly of the bushing 47 in close association with the inner surface of the side plate 42 to retain the bushing 47 tightly within the aperture 46. A cable such as that used for telephone service may be brought into the housing of the fitting 10 directly from the underfloor wire distribution system and threaded through the bushing 47 outwardly of the side plate 42 for connection with a switchboard or telephone in the immediate vicinity of the fitting 10. The bushing 47 is preferably formed from plastic material which may be readily molded. Obviously the inner diameter of the bushing may vary considerably depending upon the outer diameter of the cable threaded therethrough.

In view of the above description it should be apparent that service outlets or cable bushings may be readily installed within the electrical fitting 10 of the present invention as well as be readily removed therefrom or repaired while the fitting is in use. In the event that two of the service outlets 27 are used in back-to-back relation the fact that the top member 18 is removable from the base member 11 allows the electrician to have full access to the service outlets to make proper connections between the outlets with their respective power circuits. As a result it is unnecessary for the electrician to work under limited working space conditions as he may readily remove the top member 18 out of association with the fitting 10, connect the necessary wires to the outlet carried thereby, connect the outlet 27 carried by the base member 11 and then replace the top member 18 in its operative position following which the side plates 23 or 24 are attached and the installation of the fitting is fully completed. While special reference has been made to the flanges 40 shown in Fig. 6, it should be understood that for the purposes of the invention described herein any suitable type of arrangement may be used to fasten the electrical fitting 10 to the floor in operative association with a wire-carrying element such as a conduit, duct or floor box of an underfloor wire distribution system.

Obviously many modifications and varations of the invention as hereinbefore set forth may be made without departing from the spirit and scope thereof, and therefore only such limitations should be imposed as are indicated in the appended claims.

I claim:

1. An electrical fitting for use with an underfloor wire distribution system, said fitting including a housing formed from a base member having upwardly directed end portions and a top member having downwardly directed end portions in detachable engagement with the end portions of said base member, said base and top members defining therebetween opposite side openings in said housing at least one of which has mounted therein a service outlet, side opening cover plates detachably carried by said base and top members to cover the side openings defined thereby, said cover plates each being provided with a continuous inwardly directed marginal flange overlapping and engaging margins of said base and top members to retain the same in detachable engagement, and integrally formed spaced pairs of mounting means carried along one side of said base member and the opposite side of said top member, said mounting means being adapted for receiving cover plate fastening means when not mounting a service outlet, the cover plate over the side opening having a service outlet mounted therein being apertured to allow access to said outlet.

2. The electrical fitting of claim 1 wherein alignment means form a part of said base and top members, said alignment means including a groove defined on the inner surfaces of each of the upwardly directed end portions of said base member and depending tongues on the downwardly directed end portions of said top member with said tongues being received in said grooves.

References Cited in the file of this patent

UNITED STATES PATENTS

| | | |
|---|---|---|
| 1,088,402 | Burns | Feb. 24, 1914 |
| 1,402,769 | Hirshfield | Jan. 10, 1922 |
| 1,954,375 | Blinn | Apr. 10, 1934 |
| 2,073,490 | Lewin | Mar. 9, 1937 |
| 2,721,983 | Blinn | Oct. 25, 1955 |
| 2,738,892 | Wiesmann | Mar. 20, 1956 |

FOREIGN PATENTS

| | | |
|---|---|---|
| 459,979 | Great Britain | Jan. 19, 1937 |